(No Model.) 2 Sheets—Sheet 2.

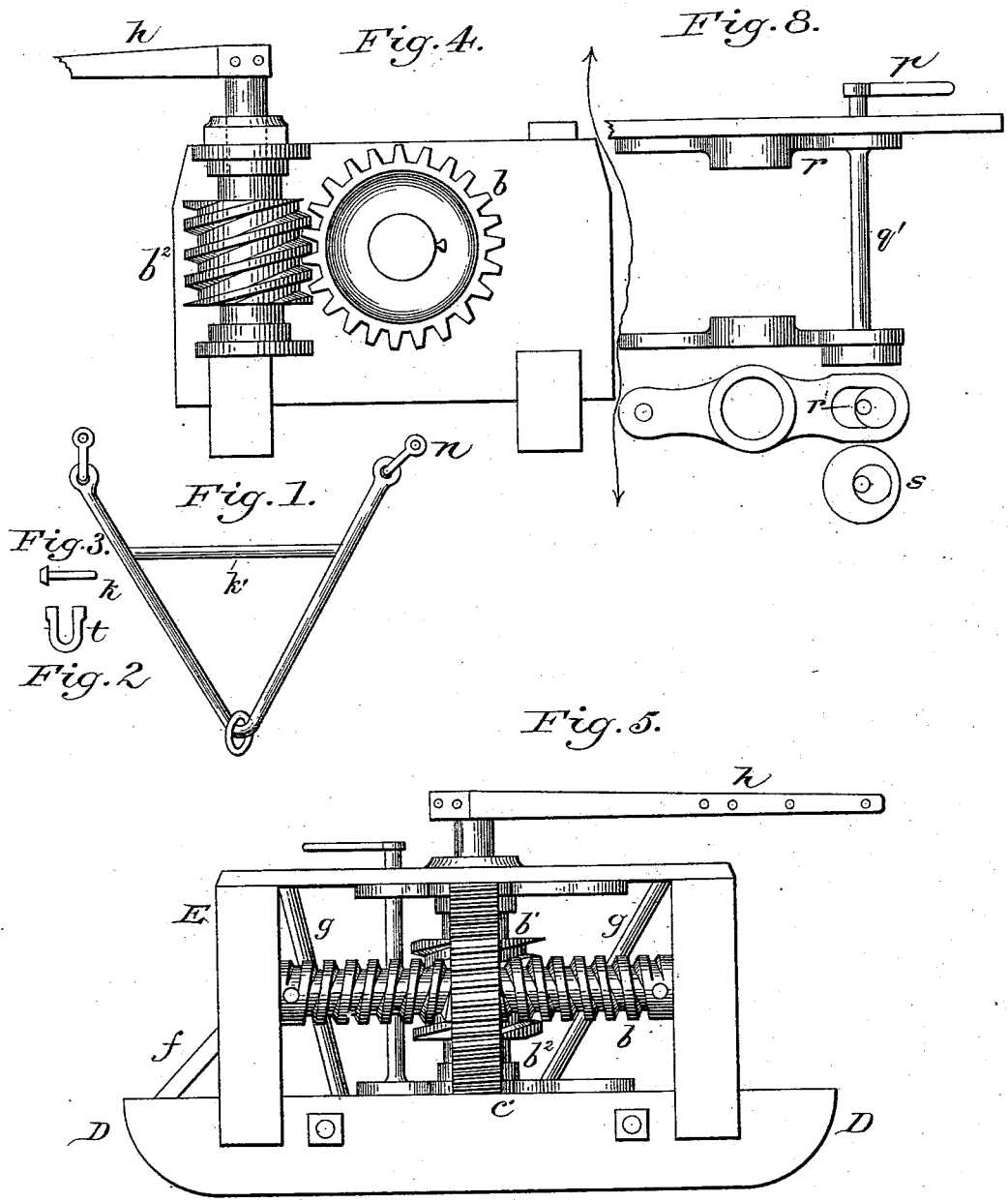

D. CORNELIUS.
STUMP AND GRUB PULLER.

No. 277,117. Patented May 8, 1883.

Witnesses: Inventor:

UNITED STATES PATENT OFFICE.

DANIEL CORNELIUS, OF LIMA, OHIO.

STUMP AND GRUB PULLER.

SPECIFICATION forming part of Letters Patent No. 277,117, dated May 8, 1883.

Application filed April 14, 1883. (No model.)

*To all whom it may concern:*

Be it known that I, DANIEL CORNELIUS, of Lima, Allen county, Ohio, have invented a certain new and useful Machine for Pulling Stumps and Grubs; and I do hereby declare that the following is a full, clear, and exact description of the construction and operation of the same, reference being had to the annexed drawings, forming a part of this specification.

This invention relates to that class of devices known by the name of "stump-pullers."

The object of my improvement is to save the trouble of unwinding a chain and reversing the movement of the whole apparatus. This object I attain by means of the mechanism shown in the accompanying drawings, in which—

Figure 7:
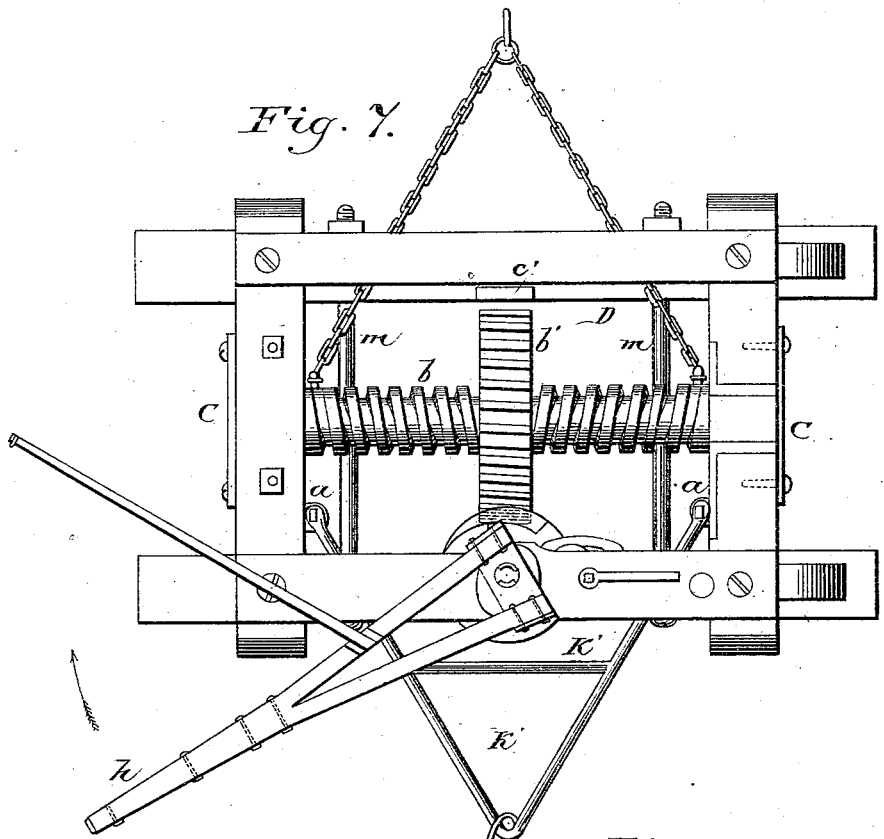
Figure 6:
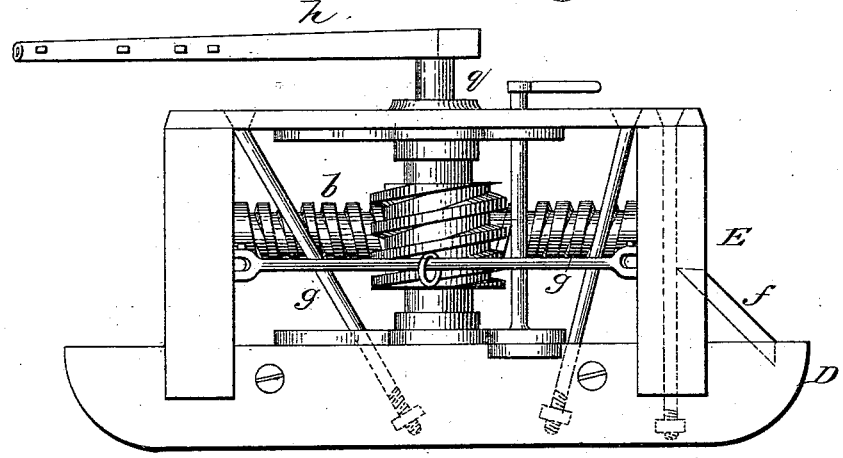

Figure 1 is a detail perspective view of the triangular bar for anchoring to the stump; Figs. 2 and 3, detail views of a clevis and pin for attaching the anchoring-bar to the boxing. Fig. 4 is a section of the screw and worm wheel; Fig. 5, an end view of the frame-work and actuating mechanism; Figs. 6 and 7, side views of same, and Fig. 8 a detail view of the cam for throwing the screw out of gear with the worm.

The machine here presented is a material improvement over and differs essentially from that shown and granted to me in Letters Patent No. 247,017, September 13, 1881, as I dispense entirely with all the gear above the frame-work and have my frame differently braced.

Referring more particularly to the drawings, the triangular bar K is fastened to the main box at $a$, as shown in Fig. 7. The spool or worm $b$ works in journal-bearings in the boxing C, secured to the frame-work E. The bar K, provided with cross-bar K', is attached to the main box by the clevis $t$, Fig. 2, so as to keep the strain off the frame.

The main frame of the machine is composed of two base-bars, D, and two end pieces, E. The base-bars D are preferably made in the shape of sled-runners, in the ends of which are attached large hooks, used for pulling the machine from place to place. A foot-brace, $f$, is used to keep the frame in place when the screw turns. Otherwise the screw would pull on the end of the cog on the worm-wheel. The iron rods $g$ are for the purpose of keeping the runners from springing, and hold the frame to its place. The shaft $q$, Fig. 6, is provided with a worm-wheel, $b$, which meshes with the screw-wheel $b^2$. On the upper end of this shaft $q$ is a square end with a slot, upon which a lever, $h$, is placed, which turns the screw and winds up the chain.

In the machine here shown there are but two wheels, the screw and worm wheel.

The machine is thrown in and out of gear by means of the eccentric cam $s$, which turns in a slot of the plates $r'$ on the shaft of the screw-wheel. The cam is secured to the rod $q'$, Fig. 8, and which throws the screw and worm wheel in and out of gear. The rod $q'$ runs from the top to the bottom of the machine, and is operated by a handle, $p$.

The machine is anchored by means of the triangular bar K. A chain, L, is fastened to the worm $b$, and is wound up on said worm, and after being wound up the worm and screw are thrown out of gear and the chain again drawn out. The chain is made of such length as will admit of the machine being moved about in a circuit of several hundred feet. The runners and frame-work are prevented from spreading by means of the rods $m$, which pass through the main frame-pieces, and are bolted thereto. In operation the main chain is drawn out as far as desired—say one hundred feet—and shorter chains are attached to the main chain, and these shorter chains are attached to the stumps in any suitable way. Power is then applied to the lever $h$, and this, through the intervention of the worm and screw, winds up the chain and pulls in its branches, which are secured to the stumps. A guard, C', is placed upon the runner D to keep the chain from going into the worm-wheel and breaking the cogs and stopping the power. I therefore obtain by the use of the two wheels, as described, all the advantages and power obtained by a complex system of gearing, and have more power with less friction of parts, and such machine is lighter, more readily handled, and durable and cheaper in construction.

The machine as constructed enables me to obtain an even and straight pull and alike on both sides. The triangular bar K, working up and down on the frame, enables the machine to adjust itself to each and every stump and equalizes the strain, and will not break out from the boxes. Thus it will be seen that I accomplish better results with less mechanism.

I have found by actual experiment that it was necessary to dispense with the series of cog-wheels shown above the frame-work in my former patent, above referred to, in order to obtain the maximum amount of work with equal power. I have dispensed with five wheels, and accomplish the result required with but two wheels.

Having thus described my invention, what I claim as new, and desire to secure by Letters Patent, is—

1. A stump-extractor consisting of a movable frame-work provided with a single screw and worm wheel actuated by a lever, a chain attached to the screw, a guard on the runner of the frame-work for preventing the chain from becoming entangled with the worm-wheel, and means, as described, for throwing the worm-wheel and screw into and out of gear, substantially as set forth, and for the purpose described.

2. A stump-extractor consisting of a suitable frame-work mounted on base-bars, a single worm-wheel and screw, a lever for actuating the screw, a chain attached to the screw, and an anchoring device, K, substantially as and for the purpose set forth.

3. In a stump-extractor, the combination, with a suitable frame-work, of a screw journaled in bearings on the frame, a single worm, actuated as described, and which meshes with a worm-wheel, and means, as described, for throwing the worm-wheel and screw into and out of gear, substantially as described.

4. In a stump-extractor, the combination, with a worm-wheel and screw secured to the frame-work, as described, of the cam and slotted cam-plate r', secured on the shaft of the screw, whereby the worm-wheel and screw are thrown into and out of gear.

5. In a stump-extractor, the anchoring-bar K, having the cross-bar K' and pivotally secured to the main frame, as and for the purpose set forth.

6. The combination of the cam secured to the rod q, and the slotted cam-plates r', mounted on the shaft of screw, substantially as and for the purpose set forth.

7. In a stump-extractor, the combination of a movable frame-work, a screw and worm wheel actuated by mechanism, as described, with the securing-rods q and foot brace or braces f, substantially as and for the purpose set forth.

In testimony that I claim the foregoing as my own I affix my signature in the presence of two witnesses.

DANIEL CORNELIUS.

Witnesses:
JOHN F. BROTHERTON,
CLOYD BROTHERTON.